(12) United States Patent
Zhao et al.

(10) Patent No.: US 12,067,766 B2
(45) Date of Patent: Aug. 20, 2024

(54) METHODS AND SYSTEMS OF RESILIENT MOBILE DISTRIBUTED COMPUTING

(71) Applicant: Intelligent Fusion Technology, Inc., Germantown, MD (US)

(72) Inventors: Qi Zhao, Germantown, MD (US); Huong Ngoc Dang, Germantown, MD (US); Yi Li, Germantown, MD (US); Xin Tian, Germantown, MD (US); Nichole Sullivan, Germantown, MD (US); Genshe Chen, Germantown, MD (US); Khanh Pham, Kirtland AFB, NM (US)

(73) Assignee: Intelligent Fusion Technology, Inc., Germantown, MD (US)

( * ) Notice: Subject to any disclaimer, the term of this patent is extended or adjusted under 35 U.S.C. 154(b) by 426 days.

(21) Appl. No.: 17/551,436

(22) Filed: Dec. 15, 2021

(65) Prior Publication Data
US 2023/0186620 A1 Jun. 15, 2023

(51) Int. Cl.
*G06V 10/94* (2022.01)
*G06V 10/764* (2022.01)
(Continued)

(52) U.S. Cl.
CPC ............ *G06V 10/95* (2022.01); *G06V 10/764* (2022.01); *G06V 10/7715* (2022.01); *G06V 10/82* (2022.01); *G06V 10/96* (2022.01)

(58) Field of Classification Search
CPC .... G06V 10/95; G06V 10/96; G06V 10/7715; G06V 10/82; G06V 10/764
See application file for complete search history.

(56) References Cited

U.S. PATENT DOCUMENTS 10,311,023 B1 * 6/2019 Bowman ............... G06F 9/5077
11,947,826 B2 * 4/2024 Olarig .................. G06F 3/0683
(Continued)

OTHER PUBLICATIONS

Iqbal, Muhammad Hussain, and Tariq Rahim Soomro. "Big data analysis: Apache storm perspective." International journal of computer trends and technology 19.1 (2015): 9-14. (Year: 2015).*

(Continued)

*Primary Examiner* — Utpal D Shah
(74) *Attorney, Agent, or Firm* — ANOVA LAW GROUP, PLLC (57) ABSTRACT

A system includes: a named data networking (NDN) based Spark distributed computing network including a Spark distributed computing network including a master computer node and a plurality of slave computer nodes, and a named data networking (NDN) protocol installed on the Spark distributed computing network, and a coded distributed computing (CDC) target recognition model deployed on the NDN-based Spark distributed computing network. The NDN-based Spark distributed computing network is configured to: receive one or more batches of input images; generate a parity image from each batch of the input images; predict a label for each image of the batch of the input images; process the generated parity image; upon a label prediction of one image of the batch of the input images being unavailable, reconstruct the unavailable label prediction; and classify labels for the input images.

20 Claims, 8 Drawing Sheets

(51) Int. Cl.
  *G06V 10/77*  (2022.01)
  *G06V 10/82*  (2022.01)
  *G06V 10/96*  (2022.01)

(56) References Cited

U.S. PATENT DOCUMENTS

| | | | | |
|---|---|---|---|---|
| 2019/0327340 | A1* | 10/2019 | Alam | H04L 67/10 |
| 2020/0151807 | A1* | 5/2020 | Zhou | G06N 3/045 |
| 2020/0279279 | A1* | 9/2020 | Chaudhuri | G06N 5/04 |
| 2021/0334645 | A1* | 10/2021 | Pardeshi | G06N 3/045 |
| 2023/0262243 | A1* | 8/2023 | Ikonin | H04N 19/42 |
| | | | | 382/239 |

OTHER PUBLICATIONS

Gibbens, Mathias, et al. "Hadoop on named data networking: Experience and results." Proceedings of the ACM on Measurement and Analysis of Computing Systems 1.1 (2017): 1-21. (Year: 2017).*

Kosaian, Jack, K. V. Rashmi, and Shivaram Venkataraman. "Parity models: erasure-coded resilience for prediction serving systems." Proceedings of the 27th ACM Symposium on Operating Systems Principles. 2019. (Year: 2019).*

* cited by examiner

METHODS AND SYSTEMS OF RESILIENT MOBILE DISTRIBUTED COMPUTING

GOVERNMENT RIGHTS

This invention was made with Government support under Contract No. W15P7T-21-C-0001, awarded by the United States Army. The U.S. Government has certain rights in this invention.

DESCRIPTION OF THE DISCLOSURE

The present disclosure relates to the field of distributed computing technology and, more particularly, relates to methods and systems of resilient mobile distributed computing combining coded computing and named data networking.

BACKGROUND

In recent years, handheld and wearable mobile technologies have reached soldiers, first responders, and disaster-relief workers in the field to aid various computationally intensive tasks, such as voice/image/video recognition, Augmented and Virtual reality (AR/VR) training, Natural-Language Processing (NLP), command and control, decision-making, and mission planning. However, the current mobile edge devices, such as smartphones, smart AR/VR glasses, tactical radio devices, robots, and drones are not powerful enough to handle intensive computation tasks. In commercial networks, one of the common solutions is to offload the computationally heavy tasks to the centralized cloud, which has much more powerful computational resources, to reduce the total task processing time. However, the communication environment for the edge devices in tactical scenarios always has very limited communication bandwidth and suffers from intermittent connectivity to higher echelons, which makes conventional centralized solutions infeasible and impractical. Though conventional distributed computing techniques provide the capability of handling computational heavy tasks in a decentralized manner, they still require either centralized schedulers or relatively more stable network connectivity. On the other hand, mobile sensing technology and the amount of mobile sensors are growing rapidly. Therefore, the enormous amount of data generated by those sensors is exceeding the ability of individual edge devices to process or store, and the network to disseminate. Thus, innovative and practical distributed computing techniques are required to perform computationally intensive tasks and data processing, which can work on resource-constrained edge devices and address changes in the number of computing nodes and associated resources as well as bandwidth limitations.

Thus, there is a need to overcome these and other problems of the prior art and to provide methods and systems for resilient mobile distributed computing combining Coded Computing (CC) and Named Data Networking (NDN).

BRIEF SUMMARY OF THE DISCLOSURE

One aspect or embodiment of the present disclosure includes a resilient distributed computing system. The system comprises a named data networking (NDN)-based Spark distributed computing network. The NDN-based Spark distributed computing network includes a Spark distributed computing network including a master computer node and a plurality of slave computer nodes, and a named data networking (NDN) protocol installed on the Spark distributed computing network. The system further comprises a coded distributed computing (CDC) target recognition model deployed on the NDN-based Spark distributed computing network. The NDN-based Spark distributed computing network is configured to: receive one or more batches of input images for classification; generate a parity image from each batch of the input images by resizing and concatenating the input images; predict a label for each image of the batch of the input images using a deep neural network (DNN)-based inference model of the CDC target recognition model; process the generated parity image using a DNN-based inference parity model of the CDC target recognition model; upon a label prediction of one image of the batch of the input images being unavailable, reconstruct the unavailable label prediction; and classify labels for the input images.

Another aspect or embodiment of the present disclosure includes a resilient distributed computing network implemented method. The method comprises: providing a Spark distributed computing network including a master computer node and a plurality of slave computer nodes; transforming the Spark distributed computing network into an NDN-based Spark distributed computing network by installing a named data networking (NDN) protocol on the Spark distributed computing network; deploying a coded distributed computing (CDC)-based target recognition model on the NDN based Spark distributed computing network to perform a target classification and recognition task; and performing the target classification and recognition task. Performing the target classification and recognition task comprises: receiving one or more batches of input images for classification; generating a parity image from each batch of the input images by resizing and concatenating the batch of the input images; predicting a label for each image of the batch of the input images using a deep neural network (DNN)-based inference base model of the CDC target recognition model; processing the generated parity image using a DNN-based inference parity model of the CDC target recognition model; upon a label prediction of one image of the batch of the input images being unavailable, reconstructing the unavailable label prediction; and classifying labels for the input images.

Another aspect or embodiment of the present disclosure includes a non-transitory computer-readable storage medium storing instructions that, when executed by one or more processors, cause the one or more processors to perform steps comprising: providing a Spark distributed computing network including a master computer node and a plurality of slave computer nodes; transforming the Spark distributed computing network into an NDN based Spark distributed computing network by installing a named data networking (NDN) protocol on a Spark distributed computing network to transform the Spark distributed computing network to an NDN-based Spark distributed computing network; deploying a coded distributed computing (CDC)-based target recognition model on the NDN based Spark distributed computing network to perform a target classification and recognition task; and performing the target classification and recognition task. Performing the target classification and recognition task includes: receiving one or more batches of input images for classification; generating a parity image from each batch of the input images by resizing and concatenating the batch of the input images; predicting a label for each image of the batch of the input images using a deep neural network (DNN)-based inference base model of the CDC target recognition model; processing the generated parity image using a DNN-based inference parity model of the CDC target recognition model; upon a label prediction of one image of the batch of the input images being unavailable, reconstructing the unavailable label prediction; and classifying labels for the input images.

Additional objects and advantages of the disclosure will be set forth in part in the description which follows, and in part will be obvious from the description, or may be learned by practice of the disclosure. The objects and advantages of the disclosure will be realized and attained by means of the elements and combinations particularly pointed out in the appended claims.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate several embodiments of the disclosure and together with the description, serve to explain the principles of the disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts. In the following description, reference is made to the accompanying drawings that form a part thereof, and which is shown by way of illustration specific exemplary embodiments in which the disclosure may be practiced. These embodiments are described in sufficient detail to enable those skilled in the art to practice the disclosure and it is to be understood that other embodiments may be utilized and that changes may be made without departing from the scope of the disclosure. The following description is, therefore, merely exemplary.

As described, the rapid growth of the demand for mobile sensing makes it difficult to process all sensing tasks on a single mobile device. Therefore, the concept of distributed computing was proposed, in which the computation tasks are distributed to all available devices in the same edge network to achieve faster data processing. However, in some critical scenarios, in which the network condition of the edge network is poor, the bandwidth of the edge network is limited, and the connection of the edge network is unstable, the edge network can significantly affect the performance of distributed computing. To overcome such issues, methods and systems of a resilient mobile distributed computing (RMSD) framework adopting an integrated solution combining Coded Computing (CC) and Named Data Networking (NDN) are provided in this disclosure. With NDN, the network traffic and information sharing within the edge network is dynamically optimized to adapt to the time-varying network condition. The CC technique can recover some of the missing computation results when an edge node is failed or disconnected. In this disclosure, the methods and systems of the RMDC framework are provided by implementing CC on top of a target recognition model and incorporating NDN into Apache Spark. The advantages of the RMDC framework include, but are not limited to, such as resilient and robust computing and reduced network traffic, which are beneficial for mobile distributed computing in critical network scenarios. The RMDC framework as disclosed herein can provide relatively high target recognition accuracy even if the original sensing data is incomplete.

The methods and systems of the RMDC framework combining the advanced CC technique and the NDN protocol as disclosed herein can enable edge devices to efficiently perform distributed computing for computational intensive tasks, and to reliably and securely process, store, and disseminate data over a tactical edge network in a disconnected, intermittent, and low-bandwidth (DIL) environment. First of all, the Spark-based distributed computing framework is created to provide the distributed computing environment for processing computationally intensive tasks. Secondly, the CC technique and the NDN protocol are incorporated to provide the resilient computing capability to enhance distributed computing when the computing environment has limited resources, such as low communication bandwidth, unstable network connectivity and/or data storage, etc. Coded computing is a novel computing paradigm that utilizes coding theory to effectively inject and leverage data/computation redundancy to mitigate several fundamental bottlenecks in large-scale distributed computing, such as communication bandwidth bottleneck, straggler's (i.e., slow or failing nodes) delay, and privacy and security bottlenecks. The Coded Distributed Computing (CDC) technique is leveraged to optimally trade extra computation resources for communication bandwidth in a MapReduce-type distributed computing environment. The NDN is an emerging network architecture that aims to change the IP network concept by naming the network data instead of network data containers to bring a number of benefits to network communication, including built-in multicast, in-network caching, multipath forwarding, and securing data directly. The NDN architecture is relied on to support sharing among devices and to allow quick recovery from losses so that the robustness and resilience of the distributed computing are delivered.

Specifically, in this disclosure, the NDN architecture is incorporated into the Spark cluster to enable Spark to operate on the NDN network. To the best of the inventor's knowledge, this is the first work that explores the potential of applying NDN to the Spark distributed computing environment. This disclosure also shows pilot research employing the CDC-based target recognition model in the Spark environment to perform the recognition task in the distributed manner. This disclosure further evaluates the performance of target recognition with much higher accuracy when the input data is incomplete.

This disclosure will next introduce the coded computing and NDN with their existing works. Then, this disclosure will explain the implementation of incorporating NDN into Spark distributed computing environment, and the implementation of employing CDC target recognition model to the NDN-based Spark. This disclosure will further provide the performance evaluation results along with analysis and discussion with respect to the RMDC framework.

As used herein, the general concept of coded computing is introduced as "Exploiting coding theory to optimally inject and leverage data/task redundancy in distributed computing systems, creating coding opportunities to overcome communication, straggler, and security bottlenecks." It perfectly fits the requirements of applying distributed computing into tactical scenarios since the mobile devices have limited computation resources and the communication quality is often relatively low. Therefore, the CDC is carried out to enhance distributed computing in such scenarios. The CDC can leverage the available or under-utilized computing resources at various parts of the network, in order to create structured redundancy in computations that provides in-network coding opportunities for significantly reducing the data shuffling load. The CDC as an emerging technique has been validated and evaluated in existing technologies. For example, the CDC was adopted in the Raptor codes to address the distributed server straggler problem, and evaluation results proved their solution is better than other traditional methods. As another example, Lagrange polynomial was used to create computation redundancy in a novel coded form across workers so that it covers many computations of interest in machine learning. As yet another example, the coded-computation technique can effectively reduce the mean-squared error under a computational deadline constraint based on a machine learning example application. Further as another example, the CDC was successfully generalized to a heterogeneous cluster to reduce the communication load. As such, the CDC has shown its capability of providing resilient and robust distributed computing to overcome adverse situations in computation and communication environments. In this disclosure, a CDC-based target recognition model is employed in the Spark distributed computing environment to validate the feasibility of the disclosed RMDC framework, and further its performance is evaluated.

Figure 1:
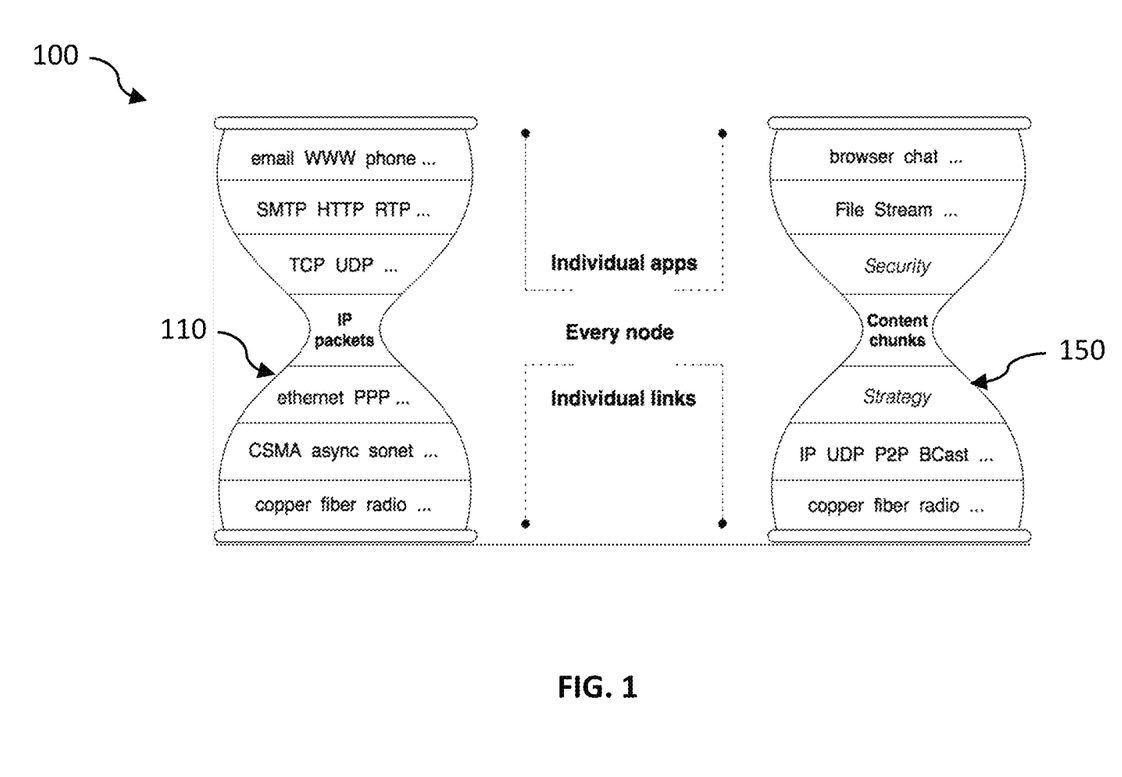
FIG. 1 depicts an overview of comparing IP protocol and NDN protocol.

As used herein, the Named Data Networking (NDN) is one of five projects funded by the U.S. National Science Foundation under its Future Internet Architecture Program and it is one instance of a more general network research direction called Information-Centric Networking (ICN), under which different architecture designs have emerged. FIG. 1 illustrates an overview 100 of comparing IP protocol 110 and NDN protocol 150. The NDN 150 is proposed to replace the thin waist of the IP architecture 110 with the content chunks of the NDN 150, such that packets can name objects other than communication endpoints as shown in FIG. 1. In addition, the NDN changes the entire traditional network semantics from transmitting the packet to a given destination IP address to fetching data identified by a given name. Everything in the network can be named, such as an endpoint, a command in an application, a data chunk, and so forth.

A great many research works on NDN are conducted in various fields to pursue the benefits of this new Internet architecture. For example, NDN was applied to networking vehicles on the run. A prototype of the NDN was also implemented over the vehicle network, and the preliminary performance assessment on the prototype of NDN was presented. The design of applying NDN in the Internet of Things (IoT) was addressed, and the main challenges were identified. The core functionality of NDN for applying it to Intelligent Transportation System (ITS) in smart cities was discussed, and the current and future research challenges for NDN-enabled ITS in the context of smart cities were highlighted. The potentialities of the NDN paradigm applied to wireless sensor networks were explored, and enhancements to the NDN forwarding strategy were proposed. How NDN addresses the challenges of the Internet of Underwater Things (IoUT) was explored, and the NDN can be adapted to potentially provide a more secure, simplified, and efficient implementation of IoUT. The implementation of modifying Apache Hadoop, a popular MapReduce framework, was explored to operate on an NDN network, and a 6% overall data transmission reduction between Hadoop nodes was identified through evaluation. Therefore, the NDN is incorporated in this disclosure into the Spark distributed environment to facilitate the CDC processing.

The NDN can provide many benefits that a traditional IP network is difficult to achieve. In this disclosure, an NDN-based distributed computing environment is disclosed. Specifically, in this disclosure, the following key features provided by NDN are leveraged to achieve resilient and robust distributed computing. The key features provided by NDN include: (1) Interest-Data Communication Pattern. NDN differs from IP network by using an Interest-Data communication pattern to initiate the data flow. The client sends out an Interest that contains the name of the requested data, and the network itself is responsible for finding the source with the requested data and sending the requested data back to the client. Since any host in the network with the corresponding data can return it to the requester, the network needs to route the Interest towards host(s) that can provide the requested data. (2) In-Network Storage. Different from the traditional IP network, NDN caches data packets in the network nodes on a downstream network path to enhance the network performance. Then, it uses such cached requested data packets to respond to new request packets. The caching is handled by the NDN Forwarding Daemon (NFD) at the network nodes automatically. (3) In-Network De-duplication. This is the main feature to reduce the communication load within the Spark cluster. NFD only forwards one copy of a data requestor response along the path. The same data requests in the future will be served by the cache of the network nodes on the path. This naturally provides the efficient multicast ability in the network with no additional protocols needed. (4) Failure Detection and Recovery. NDN data requests and responses are using the same network path by default. Thus, the network can detect the failure in the network that blocks the data response quickly when the Round-Trip-Time (RTT) expires. Then, an immediate data request re-transmission will be launched using another different path to recover the failure. Such mechanism benefits the application in a data center or cluster while the IP network cannot handle it easily.

Figure 2:
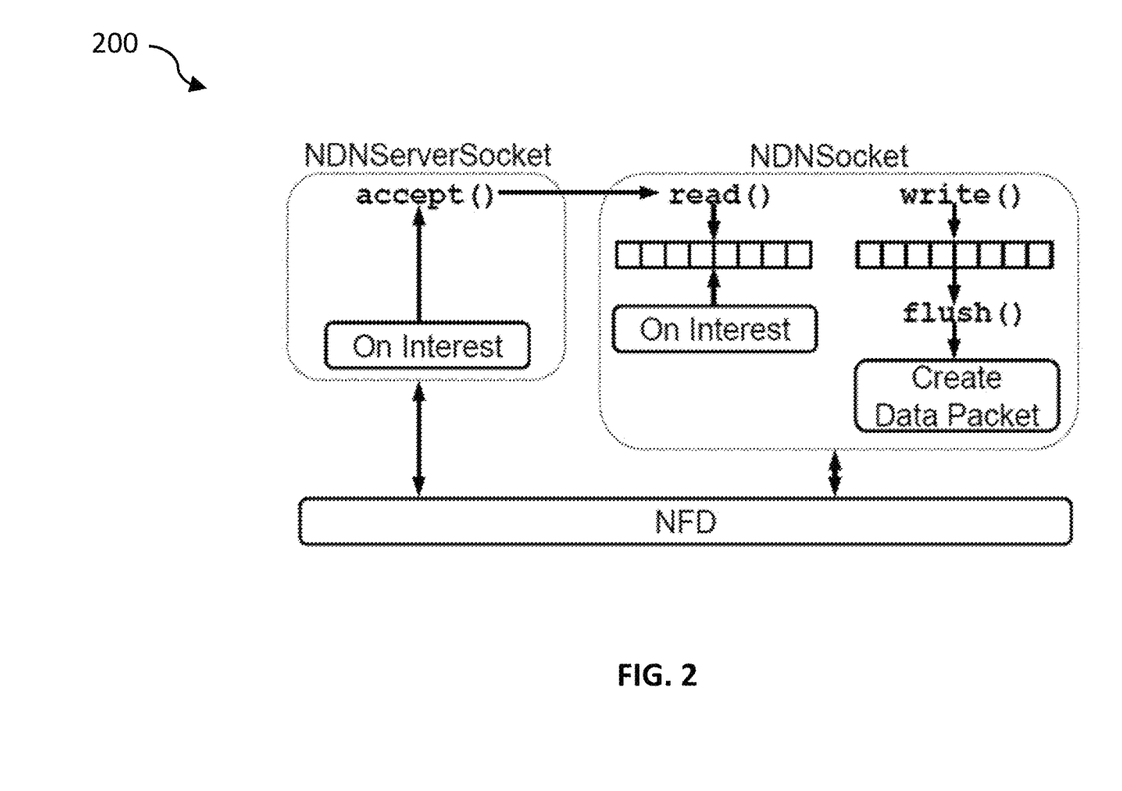
FIG. 2 illustrates a diagram depicting NDNSocket and NDNServerSocket design.

To replace the traditional IP network with NDN in the Spark cluster, the idea used in Hadoop is applied to the Spark cluster since Spark and Hadoop have very similar implementations. Apache Spark makes use of traditional Sockets and SocketChannels from Java's Socket class family for network communication like Hadoop. Following the design in Hadoop, this disclosure uses the two new generic classes (NDNSocket and NDNServerSocket as shown in FIG. 2) to update the Spark core implementation to use the NDN network instead of the IP network. The core required methods for Sockets are implemented, although some TCP-specific operations are simply ignored.

FIG. 2 illustrates a diagram 200 depicting NDNSocket and NDNServerSocket design. A brief explanation of the general process with the two classes in FIG. 2 is provided below. At the beginning phase, NDNServerSocket sets up an NDN Interest handler to queue the incoming Interests and then starts a loop (accept( )). When an NDN Interest arrives, a new NDNSocket object is created for the first time and all the same Interests will be handled by the same object in the future. Then, this NDNSocket object reads the content in a first buffer and writes the requested data into a second buffer until the second buffer is flushed or closed, at which point a Data packet is created for that Interest. On the client-side, the handling of Interest and Data packets is totally reversed. An Interest is created based on the data written to the Socket and an appropriate NDN URI is generated. Data packets which are returned are read and written into a buffer which is then exposed for reading.

After updating the core implementation of the Spark with NDN, the performance of the NDN-based Spark is evaluated with the classic wordcount MapReduce application. Based on the evaluation results, the NDN-based Spark disclosed herein can effectively reduce the traffic on the master node. For brevity, details of the implementation and the evaluation of the NDN-based Spark are omitted herein.

As an example embodiment in this disclosure, a CDC-based target recognition prototype, is designed and implemented based on a ParM model to provide robust and efficient target recognition capabilities in a challenging network condition with low bandwidth and unstable network connections. The proposed CDC-based target recognition prototype is built on Apache Spark to conduct target recognition using machine learning algorithms.

Figure 3:
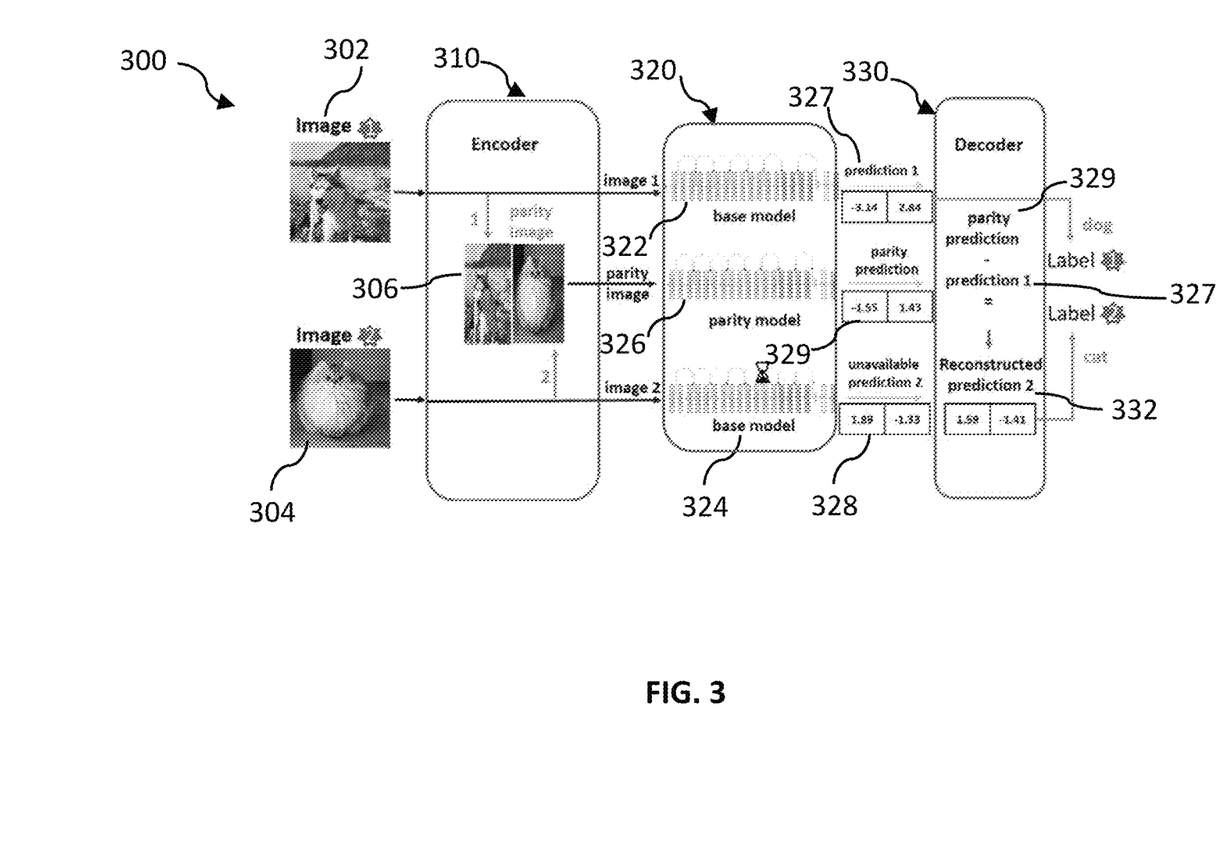
FIG. 3 illustrates an example of how an unavailable prediction/result of an image is recovered from the prediction results of another image and a parity image, according to one embodiment of the present disclosure.

To deal with a challenging network condition with low bandwidth and unstable connections, the CDC-based target recognition prototype disclosed herein employs a coded redundancy model to reduce the tail latency during inference while maintaining high accuracy. The CDC-based target recognition prototype is designed for target recognition utilizing a state-of-the-art coded redundancy model, called the ParM model. The ParM model is capable of recovering a missing inference result in a prediction batch, which may be caused by node failure or connection loss during the run time. Following this approach, a batch of input images is encoded to generate a parity image, which contains the information of all encoded images in this batch. Then the parity image is processed by a parity model, and the result from the parity model is used by a decoder to reconstruct the missing prediction/inference result. A target recognition flowchart 300 of this process is illustrated in FIG. 3. As shown in FIG. 3, the CDC-based target recognition workflow 300 may comprise three main components, namely an encoder 310, one or more Deep Neural Network (DNN) based inference models 320, and a decoder 330 respectively.

The encoder 310 may be designed to take a batch of input images for resizing and concatenation to construct a parity image. The example shown in the target recognition flowchart 300 in FIG. 3 illustrates the encoding of two input images: a dog image (i.e., image 1 302) and a cat image (i.e., image 2 304), whose sizes are all 32 by 32 pixels. The encoder 310 can resize each image to 32 by 16 pixels, and then concatenates them side-by-side horizontally to form a parity image 306. Thus, the size of the parity image 306 is 32 by 32 pixels, which is the same as normal images (e.g., image 1 302 and/or image 2 304).

In the target recognition flowchart 300 shown in FIG. 3, the one or more DNN based inference models 320 may include two different kinds of DNN based inference models: base models 322, 324 and parity model 326, respectively. Both of the base models 322, 324 and the parity model 326 are pre-trained neural networks for image processing. The base models 322, 324 are used to predict the label of each input image, and the parity model 326 is used to process the generated parity image 306. The base models 322, 324 may, for example, be a ResNet-18 model with parameters trained on a Cat versus Dog dataset. The size of the input image for this base model 322 and/or 324 may be 32 by 32 pixels, and the output of this base model is a vector of length 2, which indicates the label of the input image. The base model 322 and/or 324 may include 17 convolutional layers and a fully connected layer at the end, to process the input image. The parity model 326 is designed to process the parity images (e.g., the parity image 306), which may also utilize the ResNet-18 model. The parity model 326 can also include 17 convolutional layers and a fully connected layer, and the output of the parity model 326 is also a vector of length 2. The only difference compared to the base models 322, 324 is that the output vector of the parity model 326 is designed for decoding instead of indicating the category of the parity image 306. In the training process of the parity model 326, the training samples are generated by the encoder 310, and the training labels are generated according to the decoding function of the decoder 330 and the labels of its associated input images. More specifically, for example, a pair of input images randomly selected from the Cat versus Dog dataset are encoded to generate a training sample of the parity image, and its label is generated by adding the labels of the two input images in vector form. Mean Squared Error (MSE) between the output of the parity model 326 and the generated parity labels may be defined as the loss function in the training process of the parity model 326. The training process continues until the parity model 326 reaches a desired accuracy on the validation dataset. In this disclosure, the parity model 326 is trained over 368 iterations using PyTorch on an NVIDIA Telsa V100 GPU.

In this example embodiment, the base models 322, 324 are the same base model. In some other embodiments, the base model 322 may be a different base model from the base model 324. For example, the base model 322 may comprise more or fewer convolutional layers than the base model 324.

In some embodiments, the decoder 330 of the target recognition flowchart 300 may be used to reconstruct a missing prediction/result of a base model (e.g., the base model 322 or 324) when a corresponding prediction from the base model is not available. The decoder 330 may estimate the missing prediction/result by subtracting an available prediction/result of the base model from a parity output/prediction. The target recognition flowchart 300 in FIG. 3 illustrates an example of how an unavailable prediction/result (the unavailable prediction 2 328) of image 2 304 is recovered from the results of image 1 302 and the parity image 306 (the prediction 1 327 and the parity prediction 329, respectively). In this example, a reconstructed prediction 2 332 for the unavailable prediction 2 328 is obtained.

A general process of reconstructing a missing prediction may be described as follows. Two input images enumerated as X1 and X2 are sent to the base model for inference, and the predictions of these two input images are denoted as F(X1) and F(X2) respectively. These two prediction outputs (i.e., F(X1) and F(X2)) are all vectors having 2 floatingpoint numbers. In addition, these two input images are encoded by the encoder to generate a parity image, denoted as P. When the prediction of the image X1 is unavailable, the output of the parity model, denoted as $F_P(P)$, is used by the decoder to reconstruct the unavailable prediction F(X2) using $$F(X2)=F_P(P)-F(X1) \quad (1)$$

The decoder is able to provide a reasonable approximation of the missing base prediction.

The disclosure will next provide a brief introduction and the implementation detail of the resilient mobile distributed computing framework prototype disclosed herein. The disclosure will also present the performance evaluation results along with the result analysis and discussion.

In an example embodiment, for implementation of the disclosed CDC-based target recognition prototype, the CDC-based target recognition prototype is deployed on Apache Spark. Apache Spark is a scalable fault-tolerant distributed system for data processing. Although Spark is written in Scala, it has a Python API named PySpark, which enables interfacing with the Spark Resilient Distributed Datasets (RDDs) in a Python program using the Py4J library. PySpark provides external libraries, such as PySparkSQL that can apply SQL-like analysis on a huge amount of structured or semi-structured data. PySparkSQL also provides the DataFrame class, which is a tabular representation of structured data similar to the table in a relational database management system.

In the CDC prototype disclosed herein, the image data is loaded into Spark DataFrame, and the coded computing inference is run via a Pandas User Define Function (UDF). The Pandas UDF takes image paths as input and returns the predicted labels of the input images. Pandas UDF is a new API since PySpark 2.3. Spark transmits data through Apache Arrow and uses Pandas to process data. Apache Arrow enables efficient data transfer between the JVM and Python processes. In an example, the CDC-based target recognition prototype is implemented in Python, and deployed on a cluster comprising one master node and four slave nodes. Each node is a KVM-based (Kernel-based Virtual Machine) virtual machine with 4 Cores and 20 GB of RAM.

In addition, NFD is installed on each node in the Spark cluster so that each node is an NDN node in the cluster network. The host server machine acts as a network router with bridged network connections configured for all the virtual machines, and it runs Ubuntu 18.04 LTS with NFD version 0.7.1. An isolated network with dedicated Gigabit Ethernet links between each virtual machine and the host machine is configured to ensure no external traffic exists.

In order to investigate and test the disclosed system, the Cat versus Dog test dataset is utilized, which contains 2,500 images equally distributed between the two categories. To evaluate the performance of the disclosed system, the prediction accuracy of the disclosed CDC-based target recognition prototype is compared with that of a distributed image classification system without using the coded redundancy model. The inference without coded redundancy model is referred to as "uncoded inference" or benchmark, and the inference of the disclosed system is referred to as "coded inference". Both systems run on a Spark cluster comprising one master node and four slave nodes. The number of images used in each experiment is increased from 12 to 2,500. The prediction accuracy is computed by comparing the predicted labels with the ground truth.

In this example, the uncoded image classification inference system only utilizes the base model for image classification. First, the pre-trained base model is loaded and broadcast among all workers to enable the distributed inference. After that, image paths are loaded into the Spark DataFrame and processed by a Pandas UDF to get the predicted classes of each input image. In the Pandas UDF function, images are preprocessed in multiple steps, including resizing, shrinking center, converting into a Tensor data structure, and standardizing by channel. Then each batch of preprocessed images is sent to the base model for classification. For the disclosed CDC-based system, both the base and parity models are loaded and broadcast among the workers. In the Pandas UDF function, standardized Tensor data of two input images are combined into a parity image. If any one of two base predictions by the base model is unavailable, the decoder will estimate the missing result according to (1). It is assumed 25% of data may be lost during the classification due to the node failure for both systems.

Figure 4:
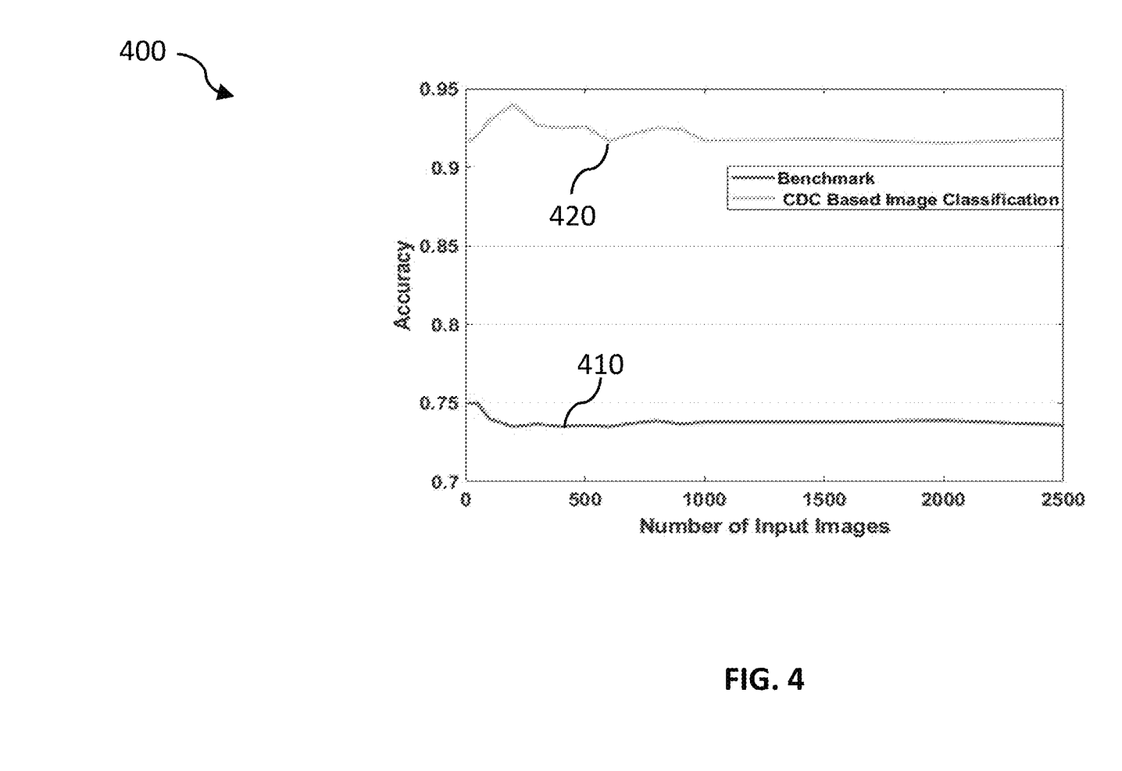
FIG. 4 depicts a diagram of the prediction accuracies of a coded reference system and an uncoded reference system, according to one embodiment of the present disclosure.

A diagram 400 of the prediction accuracies of two systems is shown in FIG. 4. As shown in FIG. 4, in terms of accuracy, the accuracy 410 of the uncoded inference system fluctuates at around 73.7%. The highest accuracy the uncoded inference system can theoretically achieve is about 75% because about 25% of the data is erased during the classification process. On the other hand, the coded inference system achieves an accuracy 420 at around 91.7%, which is much higher than the uncoded inference system. Due to the parity images, the lost classification results can be estimated via decoding. Therefore, the CDC-based target recognition prototype disclosed herein is capable of working in a challenging environment in which any node in the distributed computing cluster can get lost during the processing.

As described above, to overcome the problems associated with the existing technology, this disclosure provides the solution of enhancing the distributed computing performance by adopting CDC and NDN instead of decentralizing the distributed computing framework. Decentralization may be an efficient solution to handle the problem of node failure, however, the complexity and cost of applying such method are way higher than the solution disclosed herein since the entire computing framework has to change, including the computing model, network architecture and protocols, etc. The methods and systems provided in this disclosure can rely on the Spark distributed computing environment, which is still a centralized paradigm. However, the central control unit (i.e., the master node) can be deployed over a reliable tactical vehicle or the command center to minimize the risk of failure. In some embodiments, alternative solutions, such as distributed controller and backup controller, can be applied to complement such issues as well.

This disclosure provides a comprehensive CDC model study and evaluation to prove that CDC can provide the capability of enhancing distributed computing in a tactical environment. The systems and methods disclosed herein also successfully incorporate the NDN into the Spark distributed computing environment and deploy the CDC-based ParM target recognition model to perform the classification and recognition processing. The evaluation results provided in this disclosure demonstrate the evidence that the disclosed methods and systems are feasible and effective.

The methods and systems disclosed herein can be applied to a real mobile scenario with a more realistic networking environment. In addition, the methods and systems disclosed herein can be applied to the Spark cluster with more nodes which can validate the scalability of the disclosed framework. Furthermore, the disclosure can be applied to other target recognition or image classification models that can be used to evaluate the feasibility and generalize the model adaptation to the disclosed framework.

Figure 5:
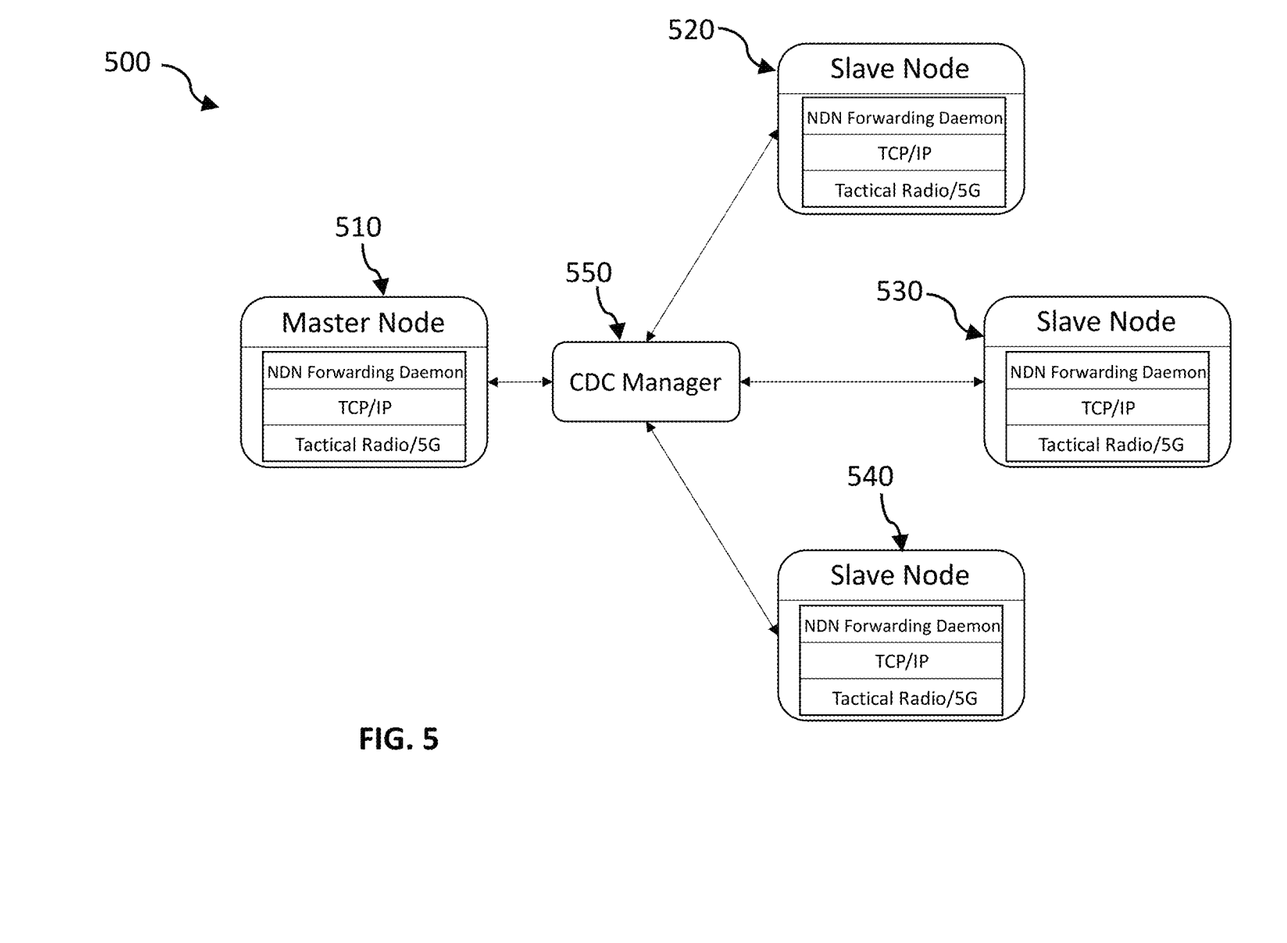
FIG. 5 shows an example system of resilient distributed computing combining coded computing and named data networking, according to one embodiment of the present disclosure.

FIG. 5 shows an example system 500 of resilient distributed computing combining coded computing and named data networking, according to an embodiment of the disclosure. The example system 500 may be an edge device network system, a mobile network system, or other suitable distributed computing systems. The example system 500 may include a master node 510, a first slave node 520, a second slave node 530, a third slave node 540, and a CDC manager 550. Although the example system 500 comprises only one master node and three slave nodes, the disclosure is not limited thereto. A system according to the disclosure may comprise any number of master nodes and/or slave nodes.

The example system 500 may be a Spark-based distributed computing cluster system. The NDN protocol/architecture may be incorporated into the example system 500 to provide the resilient computing capability to enhance distributed computing. As described above, the two new generic classes NDNSocket and NDNServerSocket can be used to update the Spark core implementation to use the NDN network instead of the IP network. With NDN, network traffic and information sharing within the edge network of the example system 500 is dynamically optimized to adapt to the time-varying network condition. As such, with the NDN architecture incorporated into the Spark cluster, the example system 500 can be an NDN-based Spark distributed computing network/environment. As an NDN-based distributed computing network, the example system 500 offers features including Interest-Data Communication Pattern, In-Network Storage, In-Network De-duplication, and Failure Detection and Recovery.

Each of the master node 510, the slave node 520, the slave node 530 and the slave node 540 may comprise hardware and software. The hardware may comprise various electrical circuitry, memory, display, and so forth. The software may comprise various system programs and application programs, such as tactical radio/5G, TCP/IP, NDN forwarding Daemon (NFD), and so forth.

The software employed on each node of the example system 500 also includes CDC that can recover some of the missing computation results when an edge node is failed or disconnected. The NDN can facilitate the CDC processing. The CDC may comprise one or more target recognition models using machine learning algorithms. The CDC-based target recognition model may employ a coded redundancy model to reduce the tail latency during inference while maintaining high accuracy. The coded redundancy model may be a ParM model that is capable of recovering a missing inference result in a prediction batch, which may be caused by node failure or connection loss during the run time.

The machine learning algorithms may comprise one or more Deep Neural Network (DNN) based inference models. One or more DNN based inference models may comprise a ResNet-18 model. The one or more DNN based inference models may include 17 convolutional layers and a fully connected layer at the end.

The example system 500 may further include a CDC manager 550. The CDC manager 550 may be configured to coordinate the master node 510 and the slave nodes 520, 530, 540, and be in data communication with the master node 510 and the slave nodes 520, 530, 540. The CDC manager 550 may be deployed on a separate and independent node, or may be deployed on the master node 510. The CDC manager 559 may include Spark Dataframe into which the image data is loaded, and the Pandas User Define Function (UDF) through which the coded computing inference is run. The Pandas UDF takes image paths as input and returns the predicted labels of the input images.

Figure 6:
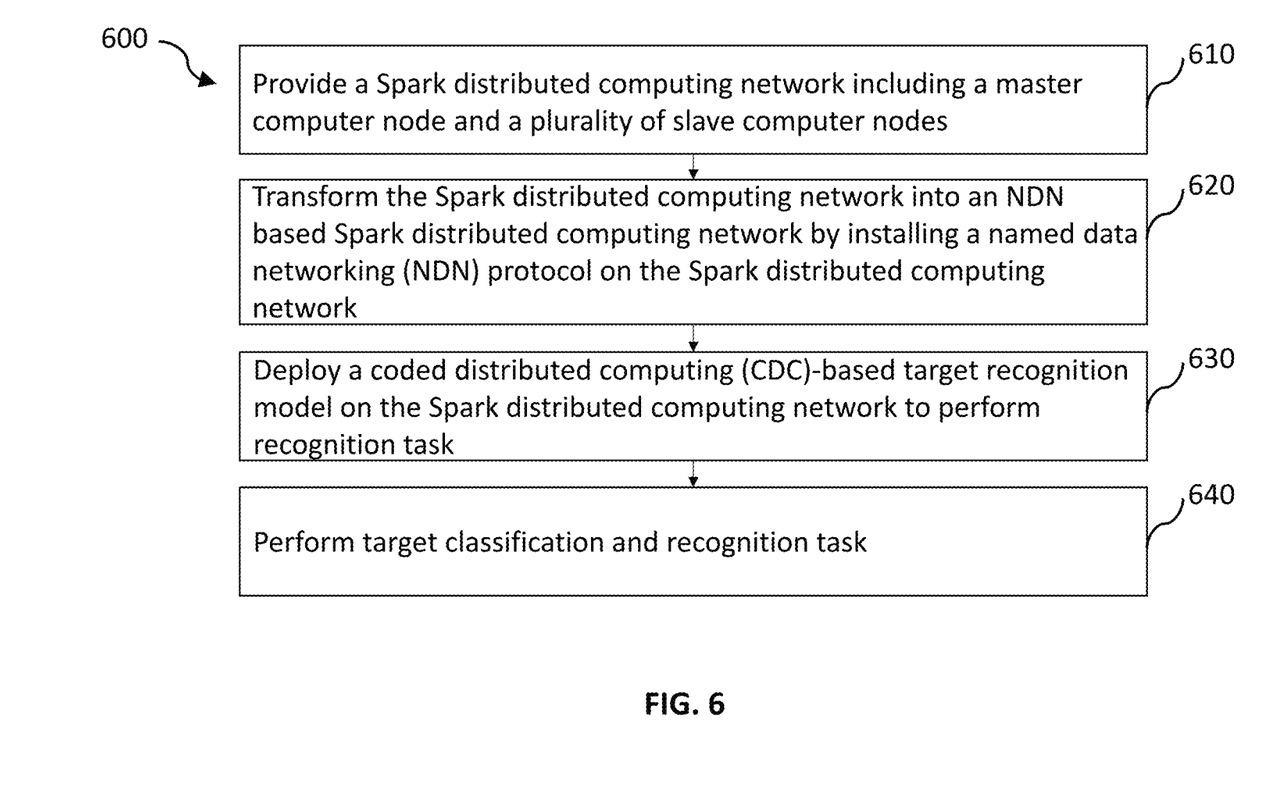
FIG. 6 shows an example method of resilient distributed computing combining coded computing and named data networking, according to one embodiment of the present disclosure.

FIG. 6 shows an example method 600 of resilient distributed computing combining coded computing and named data networking, according to an embodiment of the disclosure. The example method 600 may be implemented in a distributed computing environment/system, such as the example system 500. The example method 600 may comprise, but is not limited to, the following steps.

In step 610, a distributed computing environment, such as a Spark distributed computing network is provided. The Spark-based distributed computing network may be an edge device network that is created to provide the distributed computing environment for processing computationally intensive tasks, such as image classification and recognition. The Spark-based distributed computing network may be a cluster system comprising a plurality of nodes that include master nodes and slave nodes.

In step 620, the Spark distributed computing network is transformed into an NDN-based Spark distributed computing network by installing a named data networking (NDN) protocol on the Spark distributed computing network. The named data networking (NDN) architecture/protocol is installed on the Spark distributed computing network. The NDN architecture is incorporated into the Spark cluster to enable the Spark to operate on the NDN network. That is, the NDN architecture/protocol can transform the Spark distributed computing network/cluster to an NDN-based Spark distributed computing network/cluster. With NDN, the network traffic and information sharing within the edge network (the Spark distributed computing network) is dynamically optimized to adapt to the time-varying network condition.

In step 630, coded distributed computing (CDC)-based target recognition model is deployed on the Spark Distributed computing network having the NDN architecture perform recognition tasks in the distributed manner. The CDC-based target recognition model may include one or more models for the machine learning algorithm, such as one or more Deep Neural Network (DNN)-based inference models. The CDC-based target recognition model may be loaded into the Spark Distributed computing network having the NDN architecture and broadcast among all workers (nodes) to enable the distributed inference.

In step 640, a target classification and recognition task is performed using the CDC-based target recognition model on the Spark Distributed computing network having the NDN architecture. Details of step 640 will be described in FIG. 7 below using an example of recognizing images.

Figure 7:
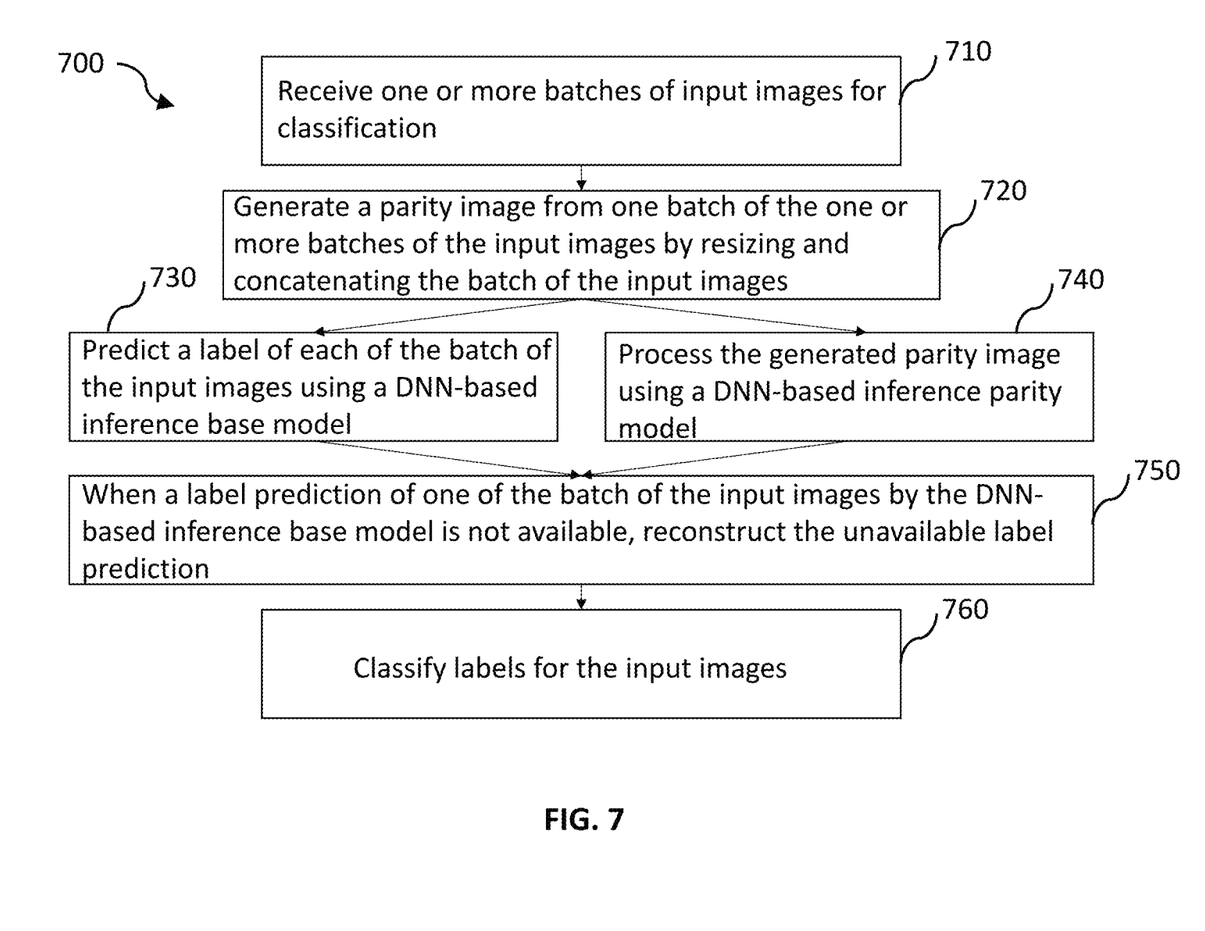
FIG. 7 shows an example method of classifying images using the resilient distributed computing combining coded computing and named data networking, according to one embodiment of the present disclosure.

FIG. 7 shows an example method 700 of classifying images using the resilient distributed computing combining coded computing and named data networking, according to an embodiment of the disclosure. The example method 700 can be implemented on the example system 500 and in the example method 600. For example, the example method 700 may be executed in step 640 of the example method 600, that is, a target classification and recognition task is performed using the CDC-based target recognition model on the Spark Distributed computing network having the NDN architecture.

Herein in the example method 700, the target classification and recognition task are to classify images. However, the example system 500 and the example methods 600 and 700 are not limited to classifying images. For example, the example system 500 can be an edge device network or cluster of smartphones, smart AR/VR glasses, tactical radio devices, robots, and drones. The target classification and recognition task can be any computationally intensive tasks, such as voice/image/video recognition, AR/VR training, Natural-Language Processing (NLP), command and control, decision-making, mission planning, and so forth.

The example method 700 may comprise, but not limited to the following steps for classifying images. In step 710, one or more batches of input images are received for classification, for example, by the example system 500. Specifically, the input images may be loaded into Spark DataFrame and processed by a Pandas User Define Function (UDF) running on the master node 510 and/or the CDC manager 550 of the example system 500. The Pandas UDF may preprocess the input images in multiple steps, for example, including resizing, shrinking center, converting into a Tensor data structure, and standardizing by channel.

In step 720, a parity image may be generated or constructed from one batch of the input images by resizing and concatenating the batch of the input images. The batch of the input images may comprise at least two input images. The number of images included in the batch may depend on the number of the slave nodes of the resilient distributed computing network/cluster. In this example, the batch of the input image includes two input images, and the Pandas UDF function combines standardized Tensor data of the two input images to generate a parity image. That is, the Pandas UDF function may act as an encoder that is configured to resize and concatenate the batch of the input images to produce the parity image. For example, to encode two input images: a dog image and a cat image, whose sizes are all 32 by 32 pixels. The Pandas UDF function as the encoder can resize each image to 32 by 16 pixels, and then concatenates them side-by-side horizontally to form a parity image. Thus, the size of the parity image is 32 by 32 pixels, which is the same as normal images (e.g., the two input images).

The batch of preprocessed images including the parity image is then communicated to the DNN base model and the DNN parity model for classifying each of the batches of preprocessed images and the parity image, respectively.

In step 730, a classification label of each image of the batch of the input images is predicted correspondingly using the DNN-based inference base model deployed on each of the nodes of the resilient distributed computing network/cluster. As described above, the DNN-based inference base model may be pre-trained neural networks for image processing. For example, the DNN-based inference base model may be a ResNet-18 model with parameters trained on a Cat versus Dog dataset. The size of each of the input images for this base model may be 32 by 32 pixels, and the output of this base model is a vector of length 2, which indicates a prediction label of the input image. The DNN-based inference base model may include 17 convolutional layers and a fully connected layer at the end, to process the input images.

In step 740, the generated parity image is processed using the DNN-based inference parity model. The DNN-based inference parity model is designed to process the parity images, which may also utilize the ResNet-18 model. The DNN-based inference parity model can also include 17 convolutional layers and a fully connected layer, and the prediction output of this parity model is also a vector of length 2. The output vector of this parity model is designed for decoding instead of indicating a label category of the parity image. The DNN-based inference parity model may be a pre-trained model with parameters trained on a Cat versus Dog dataset. In the training process of this parity model, the training samples are generated by the encoder as above, and the training labels of the training samples are generated according to the decoding function of the decoder and the prediction labels of the input images associated with the training samples. For example, a pair of input images randomly selected from the Cat versus Dog dataset are encoded to generate a training sample (i.e., a parity image), and the prediction label of this parity model for this training sample is generated by adding the prediction labels of the two input images in vector form.

In step 750, when a label prediction of one image of the batches of the input images by the DNN-based inference base model is not available, the unavailable label prediction is reconstructed. As described above, the disclosed system and method are capable of recovering some of the missing computation results when an edge node is failed or disconnected during the run time. For example, if a prediction label of one input image by a base model running on a node is missing, the missing prediction label can be reconstructed by a decoder from the prediction label of the parity image and the prediction label of the other input image. Herein, the one input image having the missing prediction label and the other input image are used by the encoder to construct the parity image. In this example embodiment, the Pandas UDF function may further act as a decoder. The decoder can reconstruct the missing prediction label by subtracting from a parity output/prediction by the parity model an available prediction label/result of another input image processed by the base model. For example, the equation (1) described above can be used to reconstruct the missing prediction label.

In step 760, labels for all of the input images may be classified. The input images can be labeled based on the corresponding predictions by the DNN-based inference base model and the DNN-base reference parity model. Steps 720-750 can be repeated till all the input images are classified. That is, method 700 can be iterated to classify all the input images.

Figure 8:
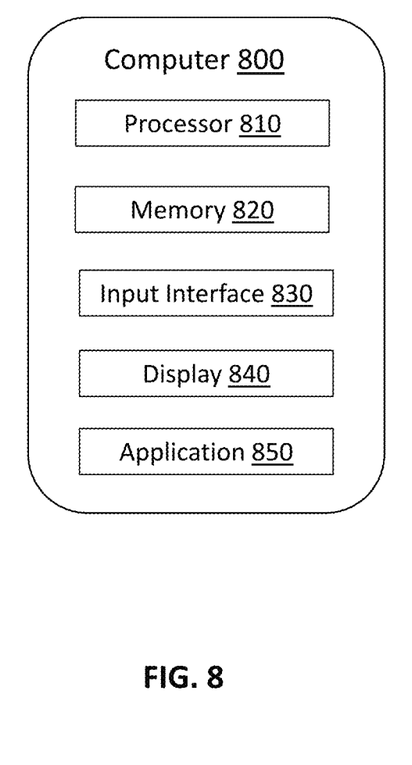
FIG. 8 illustrates an example computer system according to one embodiment of the present disclosure.

FIG. 8 illustrates an example computer system 800 according to the present disclosure. The computer system 800 may be used as any node of the resilient distributed computer network disclosed herein. For example, the computer system 800 may be used as the master node 510, the slave nodes 520-540, and the CDC manager 550 of the example system 500. The computer system 800 may include, but is not limited to, a desktop computer, a laptop computer, a notebook computer, a smartphone, a tablet computer, a mainframe computer, a server computer, a personal assistant computer, and/or any suitable network-enabled computing device. The computer system 800 may comprise a processor 810, a memory 820, an input interface 830, a display 840, and an application 850.

The processor 810 may include one or more central processing cores, processing circuitry, built-in memories, data and command encoders, additional microprocessors, and security hardware. The processor 810 may be configured to execute computer program instructions (e.g., the application 850) to perform various processes and methods.

The memory 820 may include random access memory, read-only memory, programmable read-only memory, read/write memory, and flash memory. The memory 820 may also include magnetic disks, optical disks, floppy disks, hard disks, and any suitable non-transitory computer-readable storage medium. The memory 820 may be configured to access and store data and information and computer program instructions, such as the application 850, an operating system, a web browser application, and so forth.

The input interface 830 may include graphic input interfaces and any device for entering information into the computer system 800, such as keyboards, mouses, microphones, digital cameras, video recorders, and the like.

The display 840 may include a computer monitor, a flat panel display, a liquid crystal display, a plasma panel, and any type of device for presenting information to users.

The application 850 may include one or more applications comprising instructions executable by the processor 810, such as the CDC models and the NDN protocols. The application 850, when executed by the processor 810, may enable network communications among the nodes of the resilient distributed computing network/cluster disclosed herein. Upon execution by processor 810, application 850 may perform the steps and functions described in this disclosure.

The present disclosure further provides a non-transitory computer-readable medium storing instructions that, when executed by one or more processors, cause the one or more processors to perform steps comprising: installing a named data networking (NDN) protocol on a Spark distributed computing network to transform the Spark distributed computing network to an NDN-based Spark distributed computing network; deploying a coded distributed computing (CDC)-based target recognition model on the NDN-based Spark distributed computing network to perform a target classification and recognition task; and performing the target classification and recognition task. Performing the target classification and recognition task includes: receiving input images for classification; generating a parity image from a batch of the input images by resizing and concatenating the batch of the input images; predicting a label for each of the batches of the input images using a deep neural network (DNN)-based inference base model of the CDC target recognition model; processing the generated parity image using a DNN-based inference parity model of the CDC target recognition model; upon a label prediction of one of the batch of the input images being unavailable, reconstructing the unavailable label prediction; and classifying labels for the input images.

While the disclosure has been illustrated with respect to one or more implementations, alterations and/or modifications can be made to the illustrated examples without departing from the spirit and scope of the appended claims. In addition, while a particular feature of the disclosure may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A resilient distributed computing system, comprising:
a named data networking (NDN) based Spark distributed computing network, comprising a Spark distributed computing network including a master computer node and a plurality of slave computer nodes, and a named data networking (NDN) protocol installed on the Spark distributed computing network, and a coded distributed computing (CDC) target recognition model deployed on the NDN-based Spark distributed computing network,
wherein the NDN-based Spark distributed computing network is configured to:
receive one or more batches of input images for classification;
generate a parity image from each batch of the input images by resizing and concatenating the batch of the input images;
predict a label for each input image of the batch of the input images using a deep neural network (DNN)-based inference base model of the CDC target recognition model;
process the generated parity image using a DNN-based inference parity model of the CDC target recognition model;
upon a label prediction of one input image of the batch of the input images being unavailable, reconstruct the unavailable label prediction; and
classify labels for each input image.

2. The system of claim 1, wherein the NDN-based Spark distributed computing network is an edge device network, the master computer node and the plurality of slave computer nodes including a plurality of edge devices.

3. The system of claim 1, wherein the NDN protocol includes an NDNSocket class and an NDNServerSocket class that is used to transform the Spark distributed computing network to the NDN-based Spark distributed computing network.

4. The system of claim 1, wherein the CDC target recognition model is a coded redundancy model.

5. The system of claim 4, wherein the coded redundancy model is a ParM model.

6. The system of claim 1, wherein the deep neural network (DNN)-based inference base model is a ResNet-18 model.

7. The system of claim 1, wherein the DNN-based inference base model includes 17 convolutional layers and a fully connected layer at the end.

8. The system of claim 1, wherein the DNN-based inference parity model is a ResNet-18 model.

9. The system of claim 1, wherein the DNN-based inference parity model includes 17 convolutional layers and a fully connected layer at the end.

10. A resilient distributed computing network implemented method, comprising:
providing a Spark distributed computing network including a master computer node and a plurality of slave computer nodes;
transforming the Spark distributed computing network into an NDN-based Spark distributed computing network by installing a named data networking (NDN) protocol on the Spark distributed computing network;

deploying a coded distributed computing (CDC)-based target recognition model on the NDN based Spark distributed computing network to perform a target classification and recognition task; and performing the target classification and recognition task.

11. The method of claim 10, wherein performing the target classification and recognition task comprises:

receiving one or more batches of input images for classification;

generating a parity image from each batch of the input images by resizing and concatenating the batch of the input images;

predicting a label for each image of the batch of the input images using a deep neural network (DNN)-based inference base model of the CDC target recognition model;

processing the generated parity image using a DNN-based inference parity model of the CDC target recognition model;

upon a label prediction of one image of the batch of the input images being unavailable, reconstructing the unavailable label prediction; and classifying labels for the input images.

12. The method of claim 11, wherein the input images are received by a DataFrame class of the NDN-based Spark distributed computing network.

13. The method of claim 11, further comprising:

preprocessing the input images by a Pandas User Define Function (UDF) of the NDN-based Spark distributed computing network, the preprocessing including resizing, shrinking center, converting into a Tensor data structure, and standardizing by channel.

14. The method of claim 11, wherein generating a parity image comprises combining, by a Pandas User Define Function (UDF) of the NDN-based Spark distributed computing network, standardized Tensor data of two input images to generate the parity image.

15. The method of claim 11, wherein the deep neural network (DNN)-based inference base model is a pre-trained ResNet-18 model.

16. The method of claim 11, wherein the deep neural network (DNN)-based inference parity model is a pre-trained ResNet-18 model.

17. The method of claim 11, wherein reconstructing the unavailable prediction comprises subtracting from a parity prediction of the parity image processed by the DNN-based inference parity model an available prediction label of another input image processed by the DNN-based reference base model.

18. The method of claim 11, wherein deploying a coded distributed computing (CDC)-based target recognition model comprising loading and broadcasting the DNN-based inference base model among the nodes of the NDN-based Spark distributed computing network.

19. The method of claim 11, wherein deploying a coded distributed computing (CDC)-based target recognition model comprising loading and broadcasting the DNN-based inference parity model among the nodes of the NDN-based Spark distributed computing network.

20. A non-transitory computer-readable storage medium storing instructions that, when executed by one or more processors, cause the one or more processors to perform steps comprising:

providing a Spark distributed computing network including a master computer node and a plurality of slave computer nodes;

transforming the Spark distributed computing network into an NDN based Spark distributed computing network by installing a named data networking (NDN) protocol on the Spark distributed computing network;

deploying a coded distributed computing (CDC)-based target recognition model on the NDN based Spark distributed computing network to perform a target classification and recognition task; and performing the target classification and recognition task, wherein performing the target classification and recognition task includes:

receiving one or more batches of input images for classification;

generating a parity image from each batch of the input images by resizing and concatenating the batch of the input images;

predicting a label for each image of the batch of the input images using a deep neural network (DNN)-based inference base model of the CDC target recognition model;

processing the generated parity image using a DNN-based inference parity model of the CDC target recognition model;

upon a label prediction of one image of the batch of the input images being unavailable, reconstructing the unavailable label prediction; and classifying labels for the input images.

* * * * *